Patented Jan. 3, 1928.

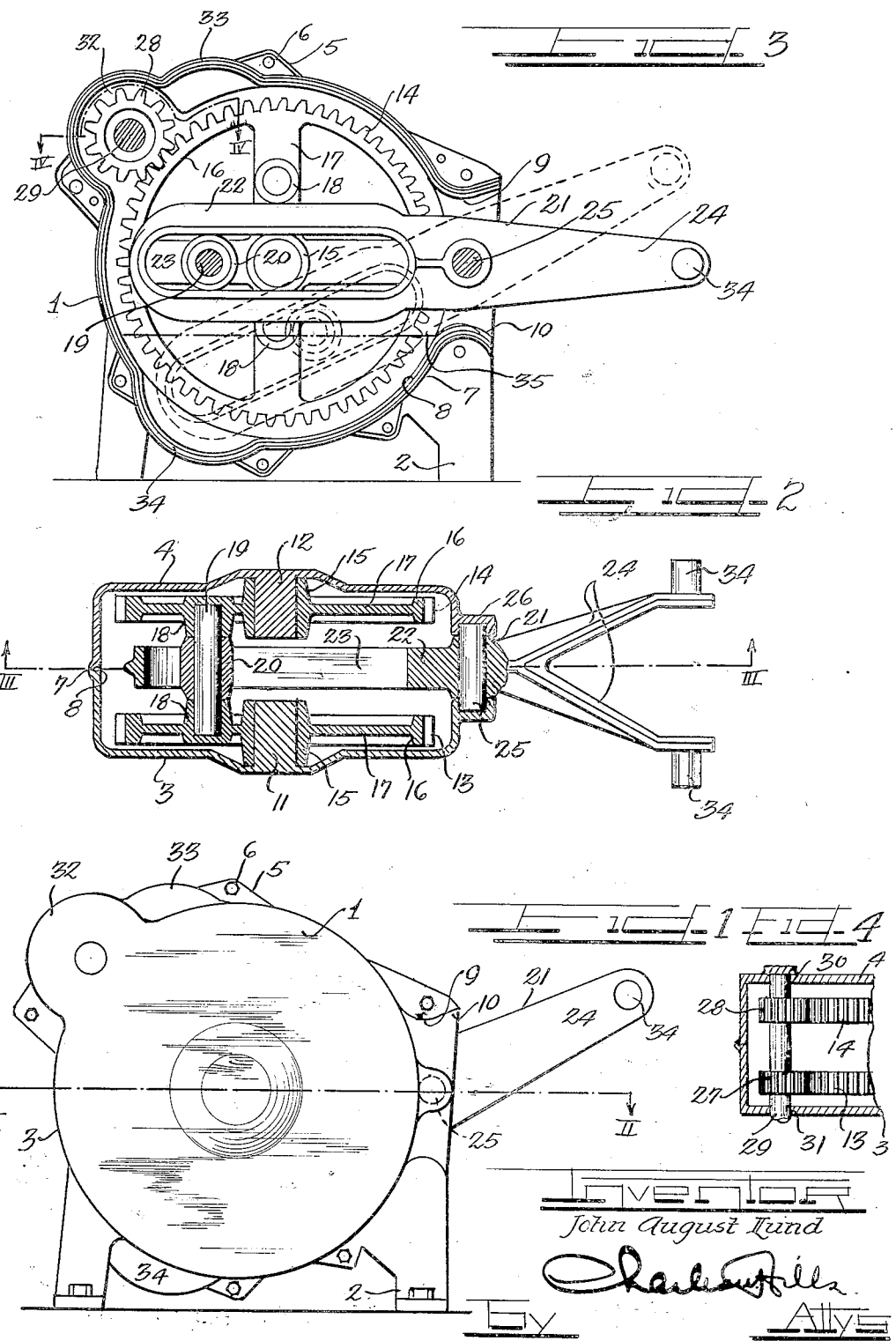

1,655,151

UNITED STATES PATENT OFFICE.

JOHN AUGUST LUND, OF BATAVIA, ILLINOIS, ASSIGNOR TO CHALLENGE COMPANY, OF BATAVIA, ILLINOIS, A CORPORATION OF ILLINOIS.

MACHINE FOR CONVERTING ROTARY INTO RECIPROCATING MOTION.

Application filed August 22, 1925. Serial No. 51,760.

This invention relates to a machine for converting rotary into reciprocating motion. The machine herein described is of the type commonly known as pump jacks and is particularly adapted for use in windmills, and other devices having primarily a rotary motion, for converting such rotary motion into reciprocating motion.

Machines of a somewhat similar character to my invention are now in use, but in general they do not achieve the simplicity of construction and of operation, nor the rugged compactness of my invention.

It is therefore an object of this invention to provide a rugged machine of great compactness and of unusual simplicity in construction and operation.

Other and further important objects of this invention will be apparent from the disclosures in the specification and the accompanying drawings.

This invention (in a preferred form) is illustrated in the drawings and hereinafter more fully described.

On the drawings:

Figure 1 is a front elevational view of a machine embodying the principles of my invention.

Figure 2 is a sectional view taken on line II—II of Figure 1, showing the lever arm in a different position and showing parts in elevation.

Figure 3 is a sectional view taken on line III—III of Figure 2, showing one extreme position of the lever arm in dotted lines.

Figure 4 is a fragmentary reduced sectional view taken on line IV—IV of Figure 3.

As shown on the drawings:

The reference numeral 1 indicates a casing provided with dependent flanged legs 2 adapted to be bolted to any suitable base. The casing 1 is formed of two complementary castings 3 and 4 of irregular outline, each having abutting flanges 5 through which bolts 6 extend to secure said castings together. The abutting edges of the two castings are provided with a raised portion 7, said portion being recessed to form an annular groove 8. Said groove 8 is adapted to be filled with a sealing means, such as white lead, to make the casing oil-tight.

As best shown in Figure 3, the castings 3 and 4 form together an opening or throat 9 that is outwardly flared as at 10 to allow room for movement of a lever 21. A pair of short, alined bearing studs 11 and 12 (see Figure 2) are formed on the central inner wall of the castings 3 and 4 respectively. Said studs 11 and 12 serve as bearings for a pair of gears 13 and 14, which are rotatably mounted on said respective studs. Said gears each comprise a hub portion 15 and a rim 16 having external gear teeth, said rim being joined by four spokes 17 to said hub portion. In three of the spokes 17 of each gear are formed oppositely facing sockets 18, each socket being at a slightly different distance from the axis of the gear. Said sockets 18 are adapted to receive a stub shaft 19, which serves to space said gears 13 and 14 properly and also to support a roller 20. Said roller 20 is rotatably mounted on said stub shaft 19 between said gears 13 and 14. A lever arm 21, comprising a slotted portion 22, having a longitudinal slot 23, and a bifurcated end 24, is pivotally mounted intermediate its ends on a pin 25. Said pin 25 is journaled in a pair of socket bearings 26 in the throat 9. The shaft 19, it will be noted, extends through said slot 23, the roller 20 being adapted to roll in the lever slot 23. As best illustrated in Figure 4, a pair of small pinion gears 27 and 28 mesh with said gears 13 and 14. Said gears 27 and 28 are rigidly secured to a driving shaft 29 said shaft being journaled in the walls of an offset portion 32 formed in the castings 3 and 4. One end of said shaft 29 is journaled in a socket bearing 30 in the casting 4 and the other end extends through a bearing 31 in the casting 3 to a source of rotary power. Other offset portions 33 and 34 are formed on the castings to allow for the movement of the slotted end of the lever arm 21, as will presently be explained. The bifurcated ends of the lever arm 21 are each provided with an outwardly extending, integral pin 34, adapted to be connected to any suitable device adapted to be driven reciprocatingly.

The operation: In operation, the driving shaft 29 is rotatably driven by any suitable power. As the shaft 29 is revolved, the gears 27 and 28 cause the gears 13 and 14 to revolve also. The rotation of the gears 13 and 14 is translated through the pin 19 and the roller 20 into a rocking movement of the lever arm 21, said roller 20 rolling in the slot 23 of the lever arm. One extreme position of the lever arm 21 is shown in dotted lines in Figure 3. The offset portions 33 and 34 allow free movement of the inner end of said lever. It is evident that the motion of the bifurcated end of the lever arm 21, although taking place through an elliptical path, may be translated into true reciprocating motion by means of a connecting rod (not shown) pivoted to the pins 34. The lower portion of the casing is adapted to be filled with oil to a height indicated by a line 35. Consequently, lubrication is very efficient and the operation is comparatively silent. It is possible in a pump jack constructed in accordance with the principles of my invention to maintain the oil at a higher level than is ordinarily the case, for the reason that in my construction the lever arm is pivoted at the throat of the casing rather than near the rear of the casing, as is customary. Consequently there is little movement of the lever arm in the throat and the throat may be made correspondingly smaller. As a result, too, the inside of the casing is better protected from dust and there is less chance of accidents occurring through articles getting into the throat. It will be noted, moreover, that when the end 24 of the lever is on the down stroke, which would naturally be the stroke of no work in pumping, the movement is relatively faster than when on the up stroke, or working stroke. This is due to the fact that the distance between the pin 19, through which the force is applied to the lever, and the fulcrum pin 25 is less when the lever arm 24 is on downstroke than when it is on its upstroke. Conversely the distance between said points is greater on the upstroke and the force required to do the work is acting at a greater leverage and therefore to better advantage.

The length of stroke may be varied by changing the pin 19 to any of the other sockets 18 on the other spokes 17. As is obvious, the nearer the pin is to the axis of the gears 13 and 14, the shorter will be the stroke.

The construction illustrated wherein the two gears 13 and 14 are journaled on bearings 11 and 12 integral with the casing castings 3 and 4 affords considerable ruggedness and strength. By spacing said gears 13 and 14 apart by means of the pin 19 and roller 20, the load is equally divided between the two gears. The drive is greatly strengthened by having the two pinion gears 27 and 28 in mesh with the two gears 13 and 14, rather than having only a single train of gears on one side of the lever arm, as is the usual construction.

I am aware that many changes may be made, and numerous details of construction may be varied through a wide range without departing from the principles of this invention, and I therefore do not purpose limiting the patent granted hereon, otherwise than necessitated by the prior art.

I claim as my invention:

1. A machine of the class described, comprising a casing having an open throat, a pair of inwardly directed bearing pins integral with said casing, a pair of gears journaled upon said pins, means for driving said gears, a lever arm pivoted at the throat of said casing, said lever arm having an inner slotted end and means secured to said gears and passing through said slot for rocking said lever arm.

2. A machine of the class described, comprising a casing formed of two complementary sections, a bearing stud integral with the inner wall of each of said sections, a gear rotatably mounted on each of said studs, a plurality of alined sockets formed on said gears at varying distances from the axes of said gears, a pin adapted to be positioned at its ends in any two of said alined sockets, a lever arm pivotally mounted intermediate its ends on said casing and having a slot therein, said slot being adapted to receive said pin, and means for driving said gears.

3. A machine of the class described comprising a casing having an opening therein and formed of two complementary sections, said sections being formed with recessed abutting edges for the purpose set forth, a slotted lever pivotally mounted intermediate its ends in said opening, bearing pins integral with said casing formed on the inner wall of said sections, gears rotatably mounted on said pins, a plurality of alined sockets formed on said gears at varying distances from the axes of said gears, a pin adapted to be positioned with its ends in said sockets, a roller mounted on said pin and adapted to follow in said slot and means for driving said gears.

In testimony whereof I have hereunto subscribed my name.

JOHN AUGUST LUND.